(12) United States Patent
Kim et al.

(10) Patent No.: US 11,989,306 B2
(45) Date of Patent: May 21, 2024

(54) VEHICLE SECURITY NETWORK DEVICE AND METHOD FOR CONTROLLING SAME

(71) Applicants: IUCF-HYU (Industry-University Cooperation Foundation Hanyang University), Seoul (KR); ICTK Holdings Co., Ltd., Seongnam-si (KR)

(72) Inventors: Dong Kyue Kim, Seoul (KR); Byong Deok Choi, Seoul (KR)

(73) Assignees: IUCF-HYU (Industry-University Cooperation Foundation Hanyang University), Seoul (KR); ICTK Holdings Co., Ltd., Seongnam-si (KR)

( * ) Notice: Subject to any disclaimer, the term of this patent is extended or adjusted under 35 U.S.C. 154(b) by 818 days.

(21) Appl. No.: 17/033,179

(22) Filed: Sep. 25, 2020

(65) Prior Publication Data
US 2021/0012015 A1  Jan. 14, 2021

Related U.S. Application Data

(62) Division of application No. 16/071,002, filed as application No. PCT/KR2017/000652 on Jan. 19, 2017, now Pat. No. 10,824,735.

(30) Foreign Application Priority Data
Jan. 19, 2016 (KR) .................. 10-2016-0006534

(51) Int. Cl.
*G06F 21/57* (2013.01)
*B60R 25/10* (2013.01)
(Continued)

(52) U.S. Cl.
CPC ............ *G06F 21/577* (2013.01); *B60R 25/10* (2013.01); *G01M 17/007* (2013.01); *G07C 5/008* (2013.01);
(Continued)

(58) Field of Classification Search
CPC .... G06F 21/577; B60R 25/10; G01M 17/007; G07C 5/008; G07C 5/02; G07C 5/08;
(Continued)

(56) References Cited

U.S. PATENT DOCUMENTS

| 2014/0180730 A1 | 6/2014 | Cordova et al. | |
| 2016/0012653 A1* | 1/2016 | Soroko | G07C 9/00309 340/5.61 |
| 2016/0255154 A1* | 9/2016 | Kim | H04L 63/08 726/25 |

FOREIGN PATENT DOCUMENTS

| CN | 1212660 A | 3/1999 |
| CN | 102461118 A | 5/2012 |

(Continued)

OTHER PUBLICATIONS

King et al. "fully Dynamic Algorithms for Maintaining All-Pairs Shortest Paths and Transitive Closure in Digraphs". IEEE (Year: 1999).*

(Continued)

*Primary Examiner* — Rachid Bendidi (57) ABSTRACT

A vehicle security network design device may comprise: a level assigning unit for assigning an automobile safety integrity level (ASIL) which provides a risk management standard for each of a plurality of functional elements in a vehicle that is at least temporarily implemented by a processor; a calculation unit for calculating device's controllability with respect to each of the plurality of functional elements on the basis of a connection structure between the plurality of functional elements and a difference value of the ASIL; and a management unit for generating a risk analysis model of a plurality of functional elements.

5 Claims, 7 Drawing Sheets

(51) Int. Cl.
    *G01M 17/00*    (2006.01)
    *G01M 17/007*   (2006.01)
    *G07C 5/00*     (2006.01)
    *G07C 5/02*     (2006.01)
    *G07C 5/08*     (2006.01)
    *G08B 21/18*    (2006.01)
    *H04L 9/40*     (2022.01)
    *H04W 4/44*    (2018.01)

(52) U.S. Cl.
    CPC ............... *G07C 5/02* (2013.01); *G07C 5/08* (2013.01); *G08B 21/18* (2013.01); *H04L 63/1433* (2013.01); *H04W 4/44* (2018.02); *H04L 2209/84* (2013.01)

(58) Field of Classification Search
    CPC . G08B 21/18; H04L 63/1433; H04L 2209/84; H04W 4/44
    See application file for complete search history.

(56) References Cited

FOREIGN PATENT DOCUMENTS

| | | | |
|---|---|---|---|
| CN | 103473831 A | 12/2013 | |
| EP | 2570309 A1 | 3/2013 | |
| KR | 101296229 B1 | 9/2013 | |
| KR | 1020150041598 A | 4/2015 | |
| KR | 101521412 B1 | 5/2015 | |
| KR | 1020150073176 A | 6/2015 | |
| WO | 2014061021 A1 | 4/2014 | |

OTHER PUBLICATIONS

Mader, R. et al., "Automatic and Optimal Allocation of Safety Integrity Levels," Proceedings of the 2012 Annual Reliability and Maintainability Symposium, Jan. 23, 2012, Reno, Nevada, 6 pages.

Burton, S. et al., "Automotive Functional Safety = Safety+ Security," Proceedings of the First International Conference on Security of Internet of Things, Aug. 17, 2012, Kollam, India, 10 pages.

Ward, D. et al., "Threat Analysis and Risk Assessment in Automotive Cyber Security," SAE International Journal of Passenger Cars—Electronics and Electrical Systems, vol. 6, No. 2, May 2013, 7 pages.

Choi, P. et al., "Analysis model for vehicle security systems considering functional safety," Proceedings of the 4th Korea-Japan Joint Workshop on Complex Communication Sciences (KJCCS'16), Jan. 12, 2016, Nozawa Onsen, Japan, 23 pages.

ISA Korean Intellectual Property Office, International Search Report Issued in Application No. PCT/KR2017/000652, dated Apr. 25, 2017, WIPO, 4 pages.

European Patent Office, Extended European Search Report Issued in Application No. 17741668.2, dated Jul. 24, 2019, Germany, 7 pages.

* cited by examiner

VEHICLE SECURITY NETWORK DEVICE AND METHOD FOR CONTROLLING SAME

CROSS-REFERENCE TO RELATED APPLICATIONS

The present application is a divisional of U.S. Non-Provisional patent application Ser. No. 16/071,002, entitled "VEHICLE SECURITY NETWORK DEVICE AND METHOD FOR CONTROLLING SAME," and filed on Oct. 10, 2018 U.S. Non-Provisional patent application Ser. No. 16/071,002 is a U.S. National Phase of International Patent Application Serial No. PCT/KR2017/000652 entitled "VEHICLE SECURITY NETWORK DEVICE AND METHOD FOR CONTROLLING SAME," filed on Jan. 19, 2017. International Patent Application Serial No. PCT/KR2017/000652 claims priority to Korean Patent Application No. 10-2016-0006534, filed on Jan. 19, 2016. The entire contents of each of the above-cited applications are hereby incorporated by reference in their entirety for all purposes.

TECHNICAL FIELD

Embodiments of the present invention relate to a field of vehicle system security and, more particularly, to a method of evaluating and managing security classes with respect to functional elements included in a vehicle and a device performing the same.

BACKGROUND AND SUMMARY

An initial automobile was an assembly of mechanical technologies. However, as gradually combined with electronic components, the automobile has enabled various functions and services such as automatic transmission, remote control and navigation and been developed to support high technology such as autonomous driving. Unlike components of general electronic products, malfunction of automobile electronic components may lead to serious accidents in some cases. With the increasing proportion of electronic components in a vehicle, the importance of "functional safety" has been emphasized. The "functional safety" refers to freedom from unreasonable risk, which means a rational risk level. The rational risk may indicate that a probability of malfunction occurrence is lowered and managed at a rational level based on classes of the electronic components.

Automobile components such as electronic components have different severities with respect to malfunction, and thus the International Organization for Standardization (ISO) 26262 standard that determines a rational risk class for each component has been established and provided as a risk analysis method for functional safety and a response method. However, the number of electronic components in a vehicle has been increased these days, and the components in the vehicle are connected to each other or other vehicles on a network. Thus, a risk analysis method considering a risk element of intended malfunction by security threats as well as malfunction caused by fault is needed. Further, the International Electrotechnical Commission (IEC) 62443 which is the industrial security standard is capable of considering a realizability of security threats, but not a characteristic of a vehicle environment.

DISCLOSURE OF INVENTION

Technical Solutions

According to an aspect of the present invention, there is provided a vehicle security network design device implemented by a processor. The vehicle security network design device may include a level assigner configured to assign an automobile safety integrity level (ASIL) which provides a risk management standard for each of a plurality of functional elements in a vehicle, a calculator configured to calculate a device's controllability with respect to each of the plurality of functional elements based on a difference in the ASIL and a connection structure between the plurality of functional elements, and a manager configured to establish and manage a risk analysis model of the plurality of functional elements based on the ASIL and the device's controllability.

The calculator may be configured to generate a graph including a vertex corresponding to each of the plurality of functional elements and an edge indicating whether data is transmitted and received between the plurality of functional elements. In further detail, the calculator may be configured to generate the graph including any one of a one-way edge and a two-way edge based on a data transmission and reception direction between two functional elements connected to each other.

The calculator may be configured to generate an edge weight matrix indicating a difference in the ASIL between two functional elements included in each edge. Further, the calculator may be configured to generate a weighted, directed graph in which the difference in the ASIL corresponding to the each edge is represented on a path of the edge.

The calculator may be configured to generate a transitive closure matrix indicating a sum of weights of at least one edge included in a path between two random vertices. Further, the calculator may be configured to calculate a difference in the ASIL between a first vertex and a second vertex as a device's controllability of a functional element corresponding to the first vertex, the second vertex maximizing the difference in the ASIL among at least one vertex having a path connected from the first vertex.

The calculator may be configured to calculate a maximum value among values of a first row of the transitive closure matrix corresponding to the first vertex as the device's controllability of the functional element corresponding to the first vertex.

The level assigner may be configured to assign a likelihood of risk occurrence with respect to each of the plurality of functional elements in the vehicle, and the manager may be configured to generate the risk analysis model of the plurality of functional elements based on the likelihood, the ASIL and the device's controllability. The level assigner may be configured to assign the likelihood according to the International Electrotechnical Commission (IEC) 62443 based on a realizability and a security vulnerability of a threat to each of the plurality of functional elements, and assign the ASIL according to the International Organization for Standardization (ISO) 26262 based on an accidental severity, an accidental exposure probability and a controllability with respect to each of the plurality of functional elements.

According to another aspect of the present invention, there is provided a method of calculating a device's controllability of a functional element in a vehicle, the method including calculating an edge weight matrix indicating a connection state of a plurality of functional elements in a vehicle based on a difference in ASIL and a connection structure between the plurality of functional elements, calculating a transitive closure matrix indicating a sum of weights of at least one edge included in a path between two random vertices using the edge weight matrix, and calculating a device's controllability of a functional element corresponding to a first vertex based on the ASIL of each of at least one vertex having a path connected from the first vertex.

The calculating of the edge weight matrix may further include generating vertices corresponding to the plurality of functional elements, and generating a graph including an edge indicating whether data is transmitted and received between two random vertices.

The generating of the graph including the edge may include generating the graph including any one of a one-way edge and a two-way edge based on a data transmission and reception direction between the two random vertices. Further, the generating of the graph including the edge may include generating a weighted, directed graph in which a difference in the ASIL between two vertices corresponding each edge is represented on a path of the each edge.

The calculating of the device's controllability may include calculating a maximum value among values of a first row of the transitive closure matrix corresponding to the first vertex as the device's controllability of the functional element corresponding to the first vertex.

The calculating of the device's controllability may include calculating a difference in the ASIL between the first vertex and a second vertex as the device's controllability of the functional element corresponding to the first vertex, the second vertex among at least one vertex having a path connected from the first vertex, and the second vertex may be a vertex which maximizes the difference in the ASIL from the first vertex.

According to still another aspect of the present invention, there is provided a program stored in a computer-readable medium, the program including an instruction set to perform a vehicle security network design method. In further detail, the instruction set may include an instruction set configured to assign a likelihood of risk occurrence with respect to each of a plurality of functional elements in a vehicle, an instruction set configured to assign an ASIL related to a risk management standard with respect to each of the plurality of functional elements in the vehicle, an instruction set configured to calculate a device's controllability with respect to each of the plurality of functional elements based on a difference in the ASIL and a connection structure between the plurality of functional elements, and an instruction set configured to generate a risk analysis model of the plurality of functional elements based on the likelihood, the ASIL and the device's controllability.

BEST MODE FOR CARRYING OUT THE INVENTION

The following detailed structural or functional description of embodiments is provided as an example only and various alterations and modifications may be made to the embodiments. Accordingly, the embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. The same component or components corresponding to each other will be provided with the same reference numeral, and their detailed explanation will be omitted.

DETAILED DESCRIPTION

Figure 1:
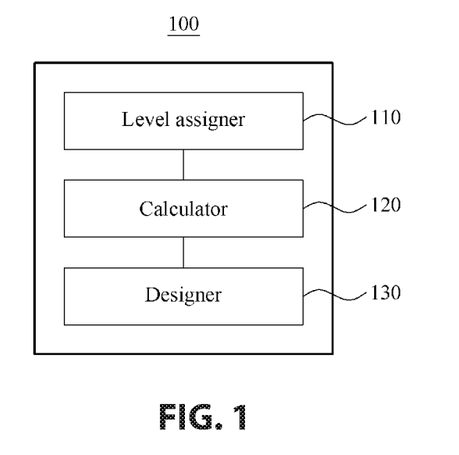
FIG. 1 is a block diagram illustrating a vehicle security network design device according to an embodiment.

FIG. 1 is a block diagram illustrating a vehicle security network design device according to an embodiment. A vehicle security network design device 100 may include a processor. Referring to FIG. 1, the vehicle security network design device 110 may include a level assigner 110, a calculator 120 and a manager 130 that are at least temporarily implemented by the processor. The level assigner 110 may assign an automobile safety integrity level (ASIL) which provides a risk management standard with respect to each of a plurality of functional elements in a vehicle. In further detail, the level assigner 110 may assign an ASIL of each of the plurality of functional elements connected to a controller area network (CAN) of the vehicle based on the following Equation 1. However, the CAN is merely an example of an intra-vehicle network (IVN) which is managed according to embodiments, and thus description provided using the example of the CAN should not be construed as limiting the scope of the present disclosure to a specific application.

$$ASIL = Severity \times Probability \times Controllability \quad \text{[Equation 1]}$$

The level assigner 110 may assign an ASIL level by combining an accidental severity level according to a hazard occurring by a fault or functional failure of a device, a probability of exposure level reflecting an operational situation of the vehicle, and a controllability of a driver since an accident may be prevented by a control of the driver although a mechanical malfunction occurs. As an example, the International Organization for Standardization (ISO) 26262 standard may be used for the ASIL level assignment of the level assigner 110.

The level assigner 110 may determine an accidental severity level as follows to assign an ASIL class related to the risk management standard. An exemplary evaluation matrix is introduced as shown in the following Table 1.

TABLE 1

| Description | No injuries | Light injuries | Severe injuries (life-threatening) |
|---|---|---|---|
| Severity level S | S0 | S1 | S2 |

In addition, the level assigner 110 may determine a probability of exposure level related to a hazard element as follows. An exemplary evaluation matrix is introduced as shown in the following Table 2.

TABLE 2

| Probability of exposure level E | Probability | Probability range (x) | Frequency |
|---|---|---|---|
| E0 | No | | |
| E1 | Very low | | Once a year |
| E2 | Low | $x < 1\%$ | Several times a year |
| E3 | Medium | $1\% \leq x < 10\%$ | Once a month |
| E4 | High | $10\% \leq x$ | Often during driving |

Further, the level assigner 110 may determine a controllability level as follows, the controllability level indicating a probability of escaping from the hazard by a control of the driver in a situation in which an accident is likely to occur. An exemplary evaluation matrix is introduced as shown in the following Table 3.

TABLE 3

| Description | Controllable | Simply controllable | Normally controllable |
|---|---|---|---|
| Situation | Easy | Avoid accident at probability of 99% or higher | Avoid accident at probability of 90% or higher |
| Controllability level C | C0 | C1 | C2 |

As shown above, the accidental severity level according to the hazard, the probability of exposure level reflecting the operational situation of the vehicle and the controllability of the driver are determined, and the level assigner 110 may assign the ASIL class by combining the same. An exemplary matrix is introduced as shown in the following Table 4.

TABLE 4

| Severity level S | Probability of exposure level E | Controllability level C | | | |
|---|---|---|---|---|---|
| | | C0 | C1 | C2 | C3 |
| S1 | E1 | QM | QM | QM | QM |
| | E2 | QM | QM | QM | QM |
| | E3 | QM | QM | QM | ASIL A |
| | E4 | QM | QM | ASIL A | ASIL B |
| S2 | E1 | QM | QM | QM | QM |
| | E2 | QM | QM | QM | ASIL A |
| | E3 | QM | QM | ASIL A | ASIL B |
| | E4 | QM | ASIL A | ASIL B | ASIL C |
| S3 | E1 | QM | QM | QM | ASIL A |
| | E2 | QM | QM | ASIL A | ASIL B |
| | E3 | QM | ASIL A | ASIL B | ASIL C |
| | E4 | ASIL A | ASIL B | ASIL C | ASIL D |

In Table 4, a quality management (QM) may indicate a basic quality without a special requirement. In a direction from ASIL A to ASIL D, a standard required for risk management with respect to a class may become higher. The above described evaluation levels may be represented as results ranked as shown in Table 4. However, in another example, it may also be represented as a risk level vector including each evaluation level as an element.

Further, according to an embodiment, the level assigner 110 may assign a likelihood of risk occurrence based on a predesignated standard with respect to each of the plurality of functional elements in the vehicle. In further detail, the level assigner 110 may assign the likelihood of risk occurrence based on the following Equation 2.

$$\text{Likelihood} = \text{Likelihood of Exploited Vulnerability} \times \text{Likelihood of Realized Threat} \quad \text{[Equation 2]}$$

The level assigner 110 may assign the likelihood of risk occurrence based on a combination of a security vulnerability (likelihood of exploited vulnerability) and a threat realizability (likelihood of realized threat) as expressed by Equation 2. In further detail, the level assigner 110 may evaluate the threat realizability level as a potential likelihood with respect to a security attack, and be determined, in detail, in view of human resources of an attacker, material resources, and a required time. For example, the threat realizability level is evaluated relatively high with respect to a low level of experience and related knowledge required for attack, a low level of equipment necessary for attack, and a less time taken for attack. Exemplary evaluation matrices are introduced in the following Table 5 and Table 6.

TABLE 5

| Evaluation standard | Content | Class | Description |
|---|---|---|---|
| Required skill | Ordinary person | High | Person with lack of or no related knowledge or experience |
| | Skilled person | Medium | Person having related knowledge or experience and capable of utilizing existing published attack method |
| | Security expert | Low | Person having knowledge and experience related to security attack and capable of proposing new attack method |
| Attack resources | General/no equipment | High | Immediately available general equipment |
| | Technical/purchased equipment | Medium | Purchasable without great effort |
| | Ordered/manufactured equipment | Low | Commonly unavailable or quite expensive, or need to be made to order |
| Attack time | Immediate | High | System malfunctions soon when attack starts |
| | Within driving time | Medium | System malfunctions by attack while vehicle is turned on |
| | Other long periods | Low | Case of long attack time to make vehicle system malfunction |

TABLE 6

Threat realizability level T

| | | Attack time | | |
|---|---|---|---|---|
| Skill | Attack resource | High | Medium | Low |
| High | High | T3 | T3 | T3 |
| | Medium | T3 | T3 | T2 |
| | Low | T3 | T2 | T1 |
| Medium | High | T3 | T3 | T2 |
| | Medium | T3 | T2 | T1 |
| | Low | T2 | T1 | — |
| Low | High | T3 | T2 | T1 |
| | Medium | T2 | T1 | — |
| | Low | T1 | — | — |

Further, the level assigner 110 may evaluate a security vulnerability exposure level based on an openness of a target system and evaluate the same based on how information of an attack target is published to an outside, how often the information is used, and how to access the information. For example, the security vulnerability exposure level may be evaluated relatively high for a high frequency of use of the target system, a lot of information being published, and a great openness of the access level. Exemplary evaluation matrices are introduced in the following Table 7 and Table 8.

TABLE 7

| Evaluation standard | Content | Class | Description |
|---|---|---|---|
| Frequency of use | High | High | Every driving/Every moment |
| | Medium | Medium | Once or twice a month/Often |
| | Low | Low | Once or twice a year/Sometimes |
| Information Publication | Published | High | Published through Internet and provided manual |
| | Involved worker | Medium | Owned by service center, manufacturing company, parts manufacturing company, etc. |
| | Confidential document | Low | Available to authorized person at service center, manufacturing company or parts manufacturing company |
| Access level | Open | High | Accessible through Internet or by unauthorized person |
| | General user | Medium | Accessible by driver only |
| | Special user | Low | Accessible with authority of service center, manufacturing company or parts manufacturing company |

TABLE 8

Security vulnerability exposure level
Vulnerability Exploited (V)

| Frequency of use | Information publication | Access level | | |
|---|---|---|---|---|
| | | High | Medium | Low |
| High | High | V3 | V3 | V3 |
| | Medium | V3 | V3 | V2 |
| | Low | V3 | V2 | V1 |
| Medium | High | V3 | V3 | V2 |
| | Medium | V3 | V2 | V1 |
| | Low | V2 | V1 | — |
| Low | High | V3 | V2 | V1 |
| | Medium | V2 | V1 | — |
| | Low | V1 | — | — |

The level assigner 110 may assign the likelihood of risk occurrence based on a combination of the assigned threat realizability level and the assigned security vulnerability exposure level, as shown in the following Table 9.

TABLE 9

Risk occurrence likelihood level D

| Realizability of threat | Security vulnerability exposure | | |
|---|---|---|---|
| | V3 | V2 | V1 |
| T3 | D4 | D3 | D2 |
| T2 | D3 | D2 | D1 |
| T1 | D2 | D1 | — |

The calculator 120 may calculate a device's controllability with respect to each of the plurality of functional elements based on a difference in the ASIL class and a connection structure between the plurality of functional elements in the vehicle. The calculated device's controllability is a different concept from a controllability of a user which is defined in the ISO 26262 standard and is a factor which is newly defined here to consider a controllability and a connection between functional elements on a network in the vehicle.

The calculator 120 may generate a graph including a vertex corresponding to each of the plurality of functional elements and an edge indicating whether data is transmitted and received between the plurality of functional elements. Here, the edge may be one of a one-way edge and a two-way edge based on a data transmission and reception direction between two functional elements (vertices) connected to each other. The calculator 120 may generate an edge weight matrix indicating a difference in the ASIL between two functional elements included in each edge. The calculator 120 may calculate a transitive closure matrix indicating a sum of weights of at least one edge included in a path between two random vertices. For each vertex, the calculator 120 may detect a class difference from vj having a greatest difference in the ASIL class from vi, with respect to the vertex vj (0≤j<k) which may receive data from the vertex vi, that is, which the vertex vi is reachable. This may be calculated by finding and taking a greatest value among all values of an (i+1)-th row in the transitive closure matrix T. The calculator 120 may deduce this as a device's controllability (DC) with respect to the vertex. Detailed examples will be described with reference to the following drawings.

The manager 130 may newly generate and manage a risk analysis model of the plurality of functional elements based on the ASIL, the likelihood and the device's controllability. The ASIL may denote a class calculated based on the ISO 26262 standard. Accordingly, the ASIL may consider factors such as an operational situation of the vehicle and a controllability of the driver which have effects when a potential threat leads to an accident.

However, the ISO 26262 standard assumes that a fault or error and a functional failure which cause occurrence of threats occurs stochastically. However, a security threat may be intentionally made by an attacker having intelligence, unlike a simple mechanical fault. Thus, the likelihood of risk occurrence may consider factors such as a likelihood with respect to the security threat like the IEC 62443. The vehicle security network design device may cover risk analysis factors that the two standards, the ISO 26262 and the IEC 62443, consider, thereby supplementing an accuracy of risk analysis related to each of the functional elements. The manager 130 may manage a vehicle security management class that is newly analyzed in this way as a security-ASIL (S-ASIL). Detailed description will be provided later using examples with reference to FIG. 7 and the like. In the description set forth hereinafter, a method of calculating the device's controllability with respect to each of the plurality of functional elements will be described in detail.

Figure 2:
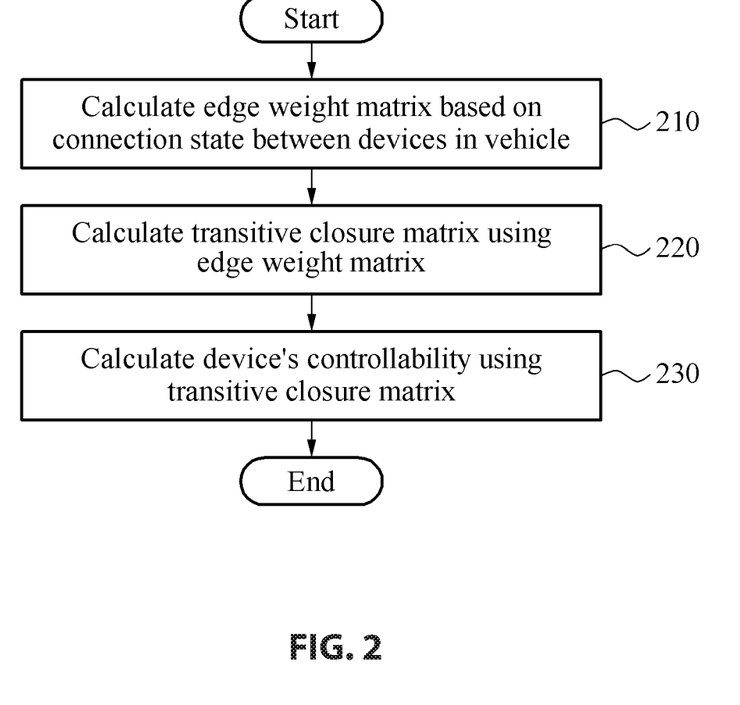
FIG. 2 is a flowchart illustrating a method of calculating a device's controllability of a functional element in a vehicle according to an embodiment.

FIG. 2 is a flowchart illustrating a method of calculating a device's controllability of a functional element in a vehicle according to an embodiment. Referring to FIG. 2, a method of calculating a device's controllability of a functional element in a vehicle may include operation 210 of calculating an edge weight matrix based on a connection state between devices in a vehicle, operation 220 of calculating a transitive closure matrix using the edge weight matrix and operation 230 of calculating a device's controllability using the transitive closure matrix.

Today, electronic control units (ECUs), various sensors, and actuators included in a vehicle may be connected on a network and exchange a variety of data with each other. Such an organic connection relationship of a plurality of devices may enable implementation of a user-centered interface with respect to the vehicle. However, there may also exist a risk of being an attack path of an outside intruder. The intruder may indirectly attack an existing well-secured device through a vulnerability of another device. To consider the likelihood as described above as well, a vehicle security network design device may generate a risk analysis model in view of a controllability and a connection between functional elements corresponding to independent devices on the network in the vehicle.

In operation 210, the vehicle security network design device may generate a graph model based on a connection structure between a plurality of functional elements in a vehicle. In the following description, a functional element may denote a minimal unit of each of a plurality of functions associated with the vehicle and a functional unit to be performed by a single electronic component. The vehicle security network design device may generate a graph model G=(V, E) including a vertex corresponding to each of the plurality of functional elements and an edge indicating a connection relationship between the plurality of functional elements.

For example, the vertex may be defined as $v_i \in V(0 \le i < k)$ which is defined as each functional element in a case in which k functional elements exist in the vehicle. In addition, the edge may indicate the connection relationship between the plurality of functional elements and whether data is transmitted and received therebetween and be defined as $(v_i, v_j) \in E (i \ne j, 0 \le i, j < k)$. In further detail, the vehicle security network design device may generate a graph model including any one of a one-way edge and a two-way edge based on a data transmission and reception direction between two functional elements connected to each other.

In another example, the vehicle security network design device may implement a one-way uploading system to prevent a change in a directivity of data transmission and reception between functional elements in response to a security threat such as hacking and physically fix a communication direction between two devices to a predetermined direction.

The one-way uploading system may be a physical and/or software function installed at a gateway which performs routing such that the functional elements are connected on a network. For example, if it has a one-way connection edge through which data is transmitted to a vertex vi and a vertex vj, and vj is unable to transmit data to vi, the one-way uploading system may be a means to non-reciprocally maintain this directivity. The one-way uploading system may guarantee a security class evaluated with respect to the functional elements and a validity of a management model therefor. Thus, while the security class is set and managed according to embodiments, the security attacker may not access or change the one-way uploading system.

Meanwhile, in another example, the one-way uploading system may be a means physically disposed between the vertex vi and the vertex vj to prevent a change of the data transmission direction. The one-way uploading system as a network element may maintain an edge direction in the original connection topology, thereby guaranteeing an evaluation, setting and a management validity of the security class.

In addition, the one-way uploading system may be implemented by other applications applicable to the field of network and communications, and a structure and an operation of the one-way uploading system that may be deduced by a person skilled in the art although not described in detail should be construed as being employed for embodiments.

Further, in operation 210, the vehicle security network design device may calculate an edge weight matrix W based on a difference in the ASIL class and a connection structure between the plurality of functional elements using the generated directed graph model. In a case of using a configuration in which the plurality of functional elements existing on the network in the vehicle is connected through the ECUs, the vehicle security network design device may use an undirected graph model. However, in an actual vehicle, rather than a simple connection relationship like data transmission and reception from a sensor to a controller or data transmission and reception from the controller to an actuator, a direction in which data is transmitted and received may exist. The vehicle security network design device may generate a more accurate risk analysis model using the directed graph model reflecting such data flow.

In further detail, the vehicle security network design device may calculate the edge weight matrix W using the following Equation 3 and Equation 4.

$$W = \begin{pmatrix} w_{0,0} & w_{0,1} & \cdots & w_{0,k-1} \\ w_{1,0} & w_{1,1} & \cdots & w_{1,k-1} \\ \vdots & \vdots & \ddots & \vdots \\ w_{k-1,0} & w_{k-1,1} & \cdots & w_{k-1,k-1} \end{pmatrix}$$ [Equation 3]

$$w_{i,j} = \begin{cases} A(v_j) - A(v_i) & \text{if } (v_i, v_j) \in E \\ nil & \text{otherwise} \end{cases}$$ [Equation 4]

A calculator in the vehicle security network design device may define a representative value $A(v_i)$ based on the ASIL class corresponding to each of the functional elements. For example, but not limited thereto, the representative value $A(v_i)$ may be "0" if the ASIL class of the vertex vi corresponding to the functional element is QM and be defined to return values of "1" through "4", respectively, if the ASIL class is ASIL A through ASIL D. Further, $w_{i,j}$ (0≤i,j<k) denotes a difference between $A(v_i)$ and $A(v_j)$ with respect to the edge $(v_i, v_j)$ and may be defined as expressed by Equation 4.

Further, the vehicle security network design device may generate a weighted, directed graph in which a difference in the representative value $A(v_i)$ corresponding to each edge is represented on a path of the edge. The generated weighted, directed graph will be described further with reference to the following drawings.

In operation 220, the vehicle security network design device may generate a transitive closure matrix using the edge weight matrix calculated in operation 210. In further detail, the calculator in the vehicle security network design device may calculate the transitive closure matrix indicating a total sum of weights of all edges included in a path between two random vertices. For example, the calculator may calculate the transitive closure matrix T as expressed by the following Equation 5 and Equation 6.

$$T = \begin{pmatrix} t_{0,0} & t_{0,1} & \cdots & t_{0,k-1} \\ t_{1,0} & t_{1,1} & \cdots & t_{1,k-1} \\ \vdots & \vdots & \ddots & \vdots \\ t_{k-1,0} & t_{k-1,1} & \cdots & t_{k-1,k-1} \end{pmatrix}$$ [Equation 5]

$$t_{i,j} = \begin{cases} w_{i,j} & \text{if } (v_i, v_j) \in E \\ w_{i,x} + \ldots + w_{y,j} & \text{if } (v_i, v_x), \ldots, (v_y, v_j) \in E \\ nil & \text{otherwise} \end{cases}$$ [Equation 6]

An element $t_{i,j}$(0≤i,j<k) of the transitive closure matrix T calculated by the vehicle security network design device may indicate a total sum of weights of all edges on a path between the two vertices $v_i$ and $v_j$. In further detail, the element $t_{i,j}$ may be defined as expressed by Equation 6. In Equation 6, vertices $v_x$ through $v_y$ may denote all vertices existing on a path between the two vertices $v_i$ and $v_j$. If a value of the element $t_{i,j}$ is nil, it may indicate that there exists no path between the two vertices $v_i$ and $v_j$. Otherwise, if the value of the element $t_{i,j}$ is present, it may indicate that there exists at least one path between the two vertices $v_i$ and $v_j$. As a result, the value of the element $t_{i,j}$ may be the same as a difference between $A(v_i)$ and $A(v_j)$, and thus in a case in which there exist at least two paths, a sum of weights of all edges on each path may be the same.

In operation 230, the vehicle security network design device may calculate a device's controllability corresponding to each of the plurality of functional elements using the transitive closure matrix. In further detail, the calculator in the vehicle security network design device may calculate a maximum value among values of a first row of the transitive closure matrix corresponding to a first vertex as a device's controllability of a functional element corresponding to the first vertex. Further, the calculator may represent a greatest difference in the ASIL class between two vertices among vertices $v_j$(0≤j<k) which the first vertex is reachable and which have a path connected from the first vertex. In addition, since a negative number in the device's controllability is meaningless, the vehicle security network design device may regard the device's controllability for a negative number as "0".

The above description has provided a modeling algorithm and a graph model used by the vehicle security network design device to generate a list analysis model. Hereinafter, an exemplary process of generating a risk analysis model in an in-vehicle networking (IVN) environment in a vehicle will be described in further detail.

Figure 3:
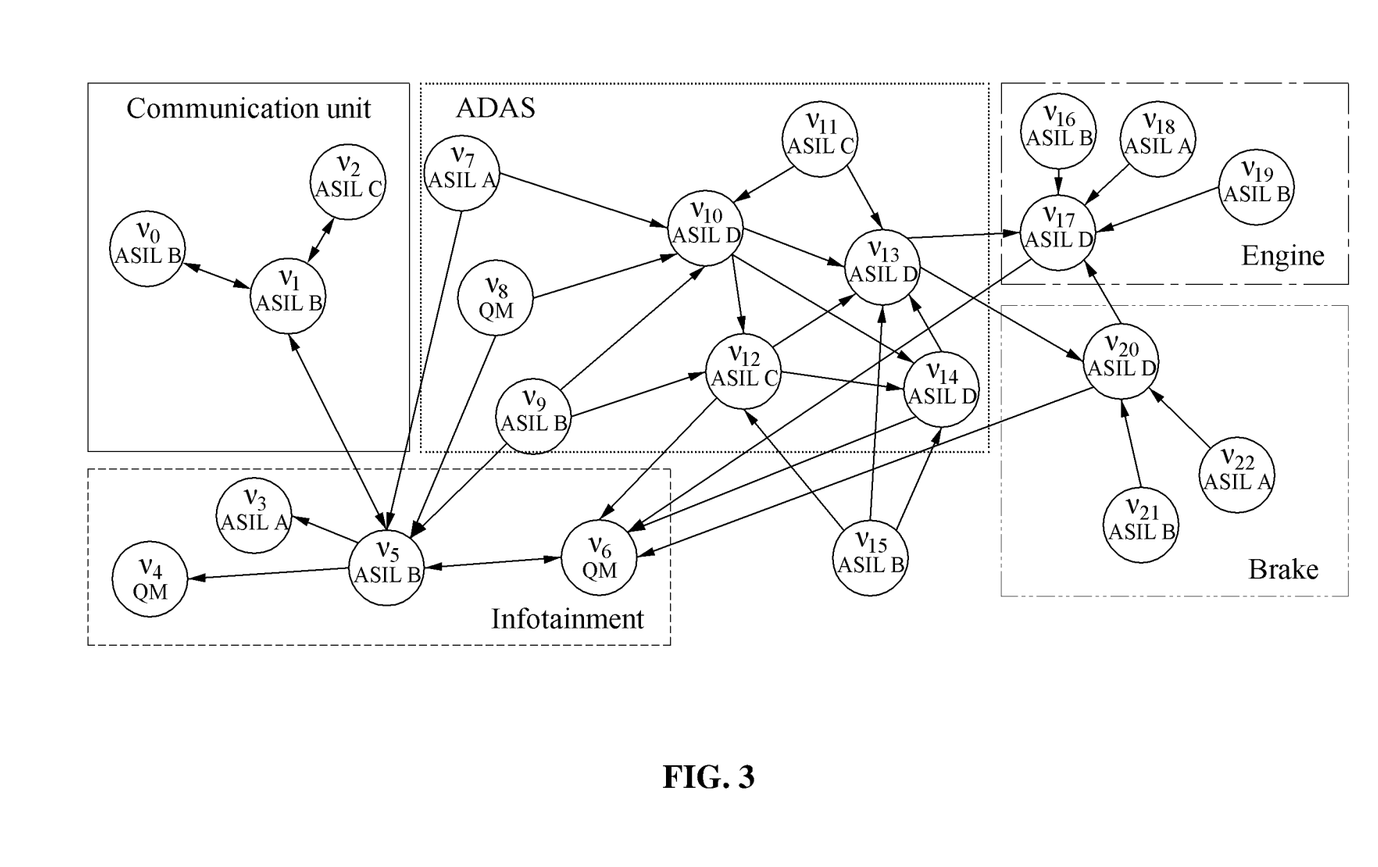
FIG. 3 illustrates an example of a graph model of functional elements in a vehicle, the graph model generated by a vehicle security network design device according to an embodiment.

FIG. 3 illustrates an example of a graph model of functional elements in a vehicle, the graph model generated by a vehicle security network design device according to an embodiment. Referring to FIG. 3, an example of a graph model representing 23 functional elements $v_0$ through $v_{22}$ included in a vehicle and a connection relationship therebetween as directed edges. For example, the respective functional elements may be grouped into different functional regions in the vehicle. In an example, the first vertex $v_0$ through the third vertex $v_2$ may be included in a communication unit. In another example, the fourth vertex $v_3$ through the seventh vertex $v_0$ may be included in an infotainment. Similarly, the eighth vertex $v_7$ through the fifteenth vertex $v_{14}$ may be included in an advanced driver-assistance system (ADAS). Further, the seventeenth vertex $v_{16}$ through the twentieth vertex $v_{19}$ may be included in an engine. In addition, the twenty-first vertex $v_{20}$ through the twenty-third vertex $v_{22}$ may be included in a brake.

An ASIL class indicated in each vertex may represent an ASIL class assigned by a level assigner in a vehicle security network design device, as described with reference to FIG. 1. For example, but not limited thereto, each ASIL class may be evaluated based on the ISO 26262 standard.

Figure 4:
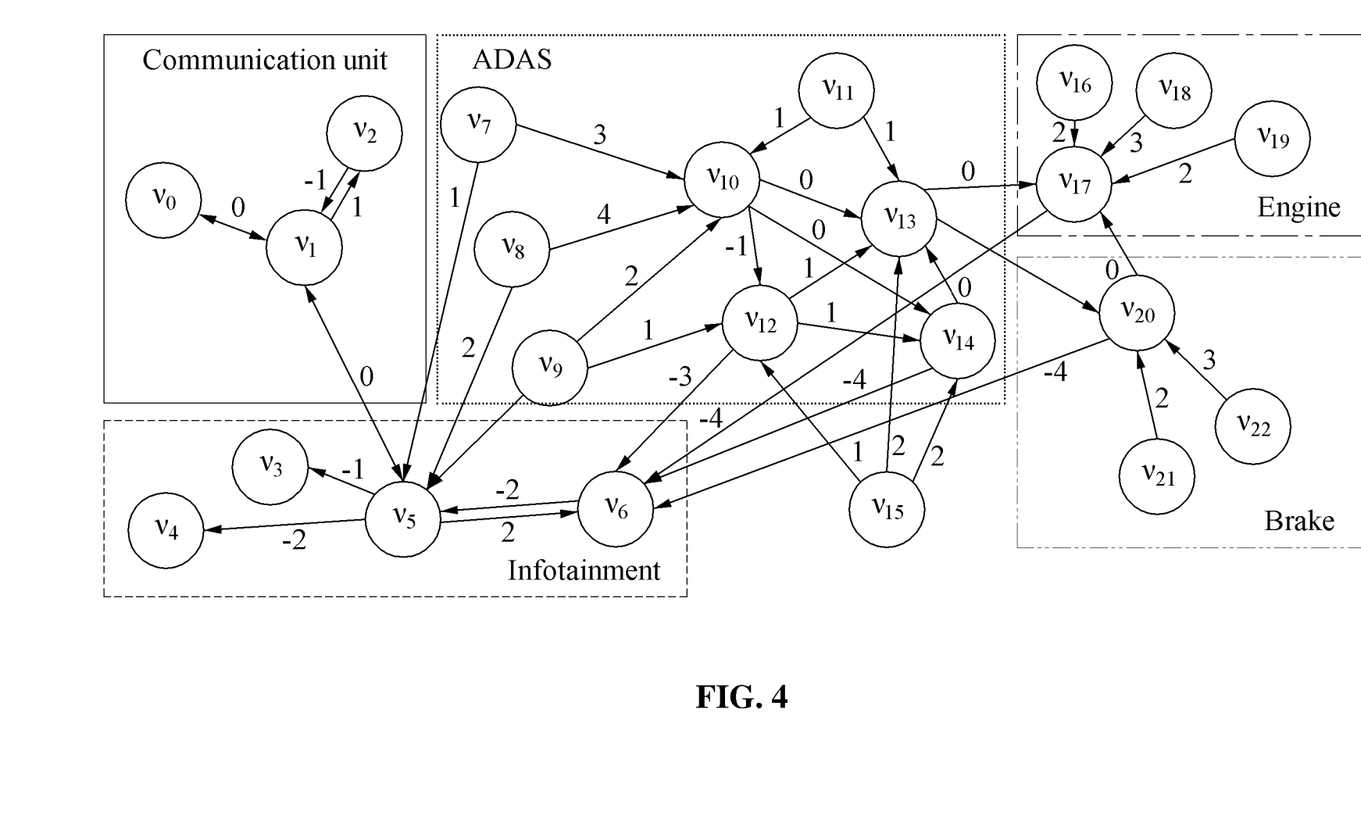
FIG. 4 illustrates an example of a weighted, directed graph generated using a generated edge weight matrix according to an embodiment.

FIG. 4 illustrates an example of a weighted, directed graph generated using a generated edge weight matrix according to an embodiment. Referring to FIG. 4, a weighted, directed graph generated with respect to the plurality of functional elements in the vehicle of FIG. 3 is illustrated. A vehicle security network design device may generate an edge weight matrix W indicating a difference in an ASIL class between two functional elements included in each edge according to Equation 3 and Equation 4.

The edge weight matrix W related to the plurality of functional elements in the vehicle in the example of FIG. 3 may be calculated as shown in the following Table 10.

TABLE 10

| j\i | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| 0 |  | 0 |  |  |  |  |  |  |  |  |  |  |  |  |  |  |  |  |  |  |  |  |  |
| 1 | 0 |  | 1 |  |  | 0 |  |  |  |  |  |  |  |  |  |  |  |  |  |  |  |  |  |
| 2 |  | -1 |  |  |  |  |  |  |  |  |  |  |  |  |  |  |  |  |  |  |  |  |  |
| 3 |  |  |  |  |  |  |  |  |  |  |  |  |  |  |  |  |  |  |  |  |  |  |  |
| 4 |  |  |  |  |  |  |  |  |  |  |  |  |  |  |  |  |  |  |  |  |  |  |  |
| 5 | 0 |  |  | -1 | -2 |  | -2 |  |  |  |  |  |  |  |  |  |  |  |  |  |  |  |  |
| 6 |  |  |  |  |  | 2 |  |  |  |  |  |  |  |  |  |  |  |  |  |  |  |  |  |
| 7 |  |  |  |  |  | 1 |  |  | 3 |  |  |  |  |  |  |  |  |  |  |  |  |  |  |
| 8 |  |  |  |  |  | 2 |  |  | 4 |  |  |  |  |  |  |  |  |  |  |  |  |  |  |
| 9 |  |  |  |  |  | 0 |  |  |  |  | 2 |  |  |  |  |  |  |  |  |  |  |  |  |
| 10 |  |  |  |  |  |  |  |  |  |  |  | -1 | 0 | 0 |  |  |  |  |  |  |  |  |  |
| 11 |  |  |  |  |  |  |  |  |  |  |  | 1 |  | 1 |  |  |  |  |  |  |  |  |  |
| 12 |  |  |  |  |  |  |  |  |  | -3 |  |  |  | 1 | 1 |  |  |  |  |  |  |  |  |
| 13 |  |  |  |  |  |  |  |  |  |  |  |  |  |  |  |  |  | 1 |  |  | 1 |  |  |
| 14 |  |  |  |  |  |  |  |  |  | -4 |  |  |  | 0 |  |  |  |  |  |  |  |  |  |
| 15 |  |  |  |  |  |  |  |  |  |  |  |  | 1 | 2 |  | 2 |  |  |  |  |  |  |  |
| 16 |  |  |  |  |  |  |  |  |  |  |  |  |  |  |  |  |  | 2 |  |  |  |  |  |
| 17 |  |  |  |  |  |  |  |  |  | -4 |  |  |  |  |  |  |  |  |  |  |  |  |  |
| 18 |  |  |  |  |  |  |  |  |  |  |  |  |  | 3 |  |  |  |  |  |  |  |  |  |
| 19 |  |  |  |  |  |  |  |  |  |  |  |  |  | 2 |  |  |  |  |  |  |  |  |  |
| 20 |  |  |  |  |  |  |  |  |  | -4 |  |  |  | 0 |  |  |  |  |  |  |  |  |  |
| 21 |  |  |  |  |  |  |  |  |  |  |  |  |  |  |  |  |  | 2 |  |  |  |  |  |
| 22 |  |  |  |  |  |  |  |  |  |  |  |  |  |  |  |  |  | 3 |  |  |  |  |  |

For example, ASIL classes of the tenth vertex $v_9$ and the eleventh vertex $v_{10}$ may be assigned as ASIL B and ASIL D, respectively. In this example, with respect to a representative value $A(v_i)$ corresponding to an ASIL class, $A(v_9)$ may be determined to be "2", and $A(v_{10})$ may be determined to be "4". Accordingly, the vehicle security network design device may calculate an element $w_{9,10} = A(v_{10}) - A(v_9)$ of the edge weight matrix W to be "2". Similarly, the vehicle security network design device may calculate a value of each element of the edge weight matrix W. A value of nil is a non-existent value and thus, is not represented in Table 10.

The weighted, directed graph of FIG. 4 may include 23 vertices. Further, the weighted, directed graph may further include edges representing data transmission and reception relationships of functional elements respectively corresponding to the 23 vertices. The edges may each include any one of a one-way edge and a two-way edge. In addition, the weighted, directed graph may represent a difference between representative values $A(v_i)$ corresponding to ASIL classes of two vertices connected along the edge on a path of the edge.

Figure 5:
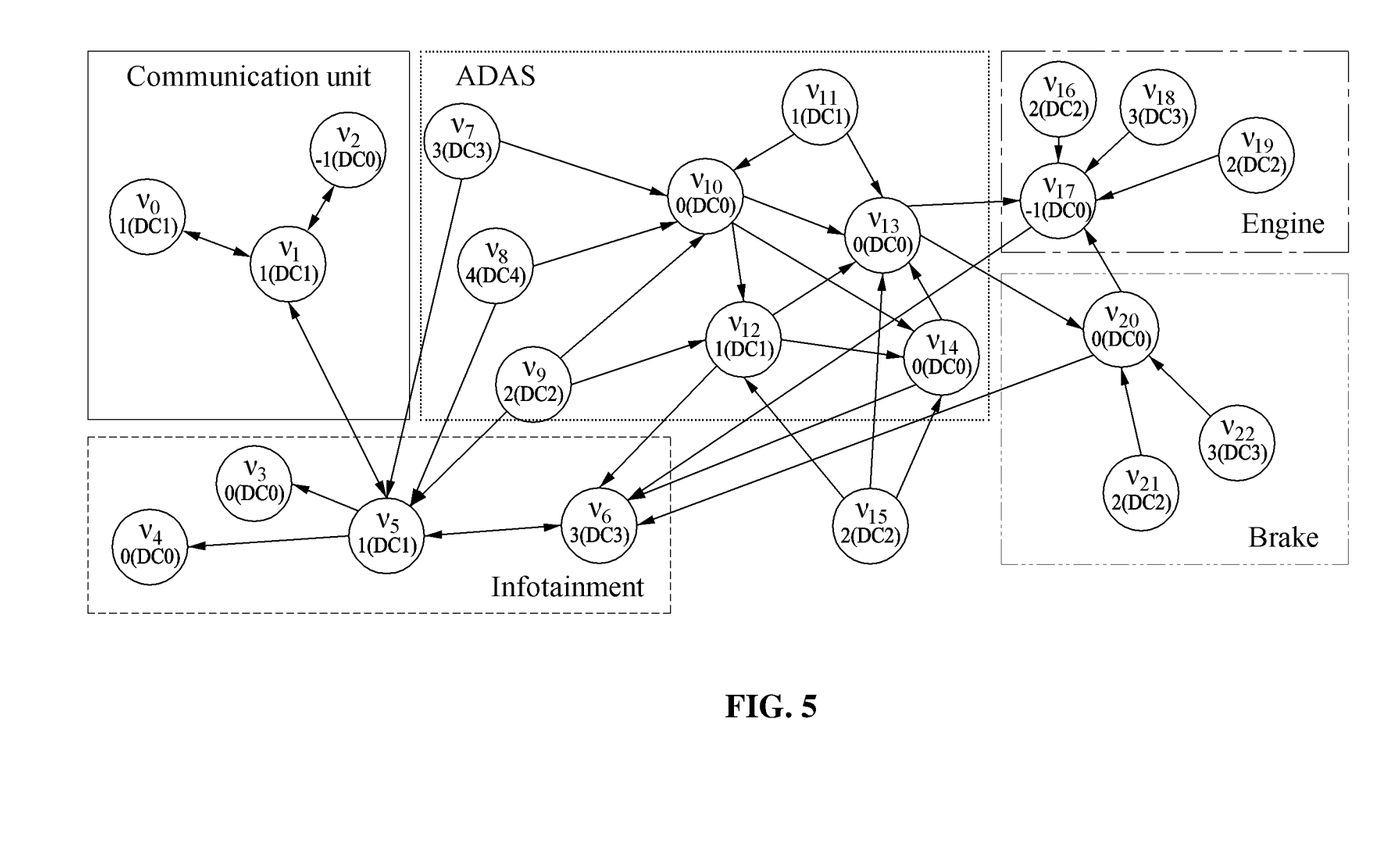
FIG. 5 illustrates an example of a directed graph reflecting a device's controllability according to an embodiment.

FIG. 5 illustrates an example of a directed graph reflecting a device's controllability according to an embodiment.

According to Equation 5 and Equation 6, a vehicle security network design device may calculate a transitive closure matrix T using the weighted, directed graph described with reference to FIG. 4. For example, referring to the graph of FIG. 4, there may exist two shortest paths connected from the tenth vertex $v_9$ to the fourth vertex $v_{13}$. In further detail, a first path $p_1$ may be a path passing through the vertices $v_9$, $v_{10}$ and $v_{13}$. In addition, a second path $p_2$ may be a path passing through the vertices $v_9$, $v_{12}$ and $v_{13}$.

Accordingly, a calculator in the vehicle security network design device may calculate an element $t_{9,13} = w_{9,10} + w_{10,13} = w_{9,12} + w_{12,13}$ of the transitive closure matrix T to be "2". As described above, irrespective of a path, the element $t_{i,j}$ may be consequentially calculated by $A(v_j) - A(v_i)$, and thus a resulting value may be the same. For example, the transitive closure matrix T calculated using the weighted, directed graph described with reference to FIG. 4 may be calculated as shown in the following Table 11.

TABLE 11

| j\i | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| 0 |  | 0 | 1 | -1 | -2 | 0 | -2 |  |  |  |  |  |  |  |  |  |  |  |  |  |  |  |  |
| 1 | 0 |  | 1 | -1 | -2 | 0 | -2 |  |  |  |  |  |  |  |  |  |  |  |  |  |  |  |  |
| 2 | -1 | -1 |  | -2 | -3 | -1 | -3 |  |  |  |  |  |  |  |  |  |  |  |  |  |  |  |  |
| 3 |  |  |  |  |  |  |  |  |  |  |  |  |  |  |  |  |  |  |  |  |  |  |  |
| 4 |  |  |  |  |  |  |  |  |  |  |  |  |  |  |  |  |  |  |  |  |  |  |  |
| 5 | 0 | 0 | 1 | -1 | -2 |  | -2 |  |  |  |  |  |  |  |  |  |  |  |  |  |  |  |  |
| 6 | 2 | 2 | 3 | 1 | 0 | 2 |  |  |  |  |  |  |  |  |  |  |  |  |  |  |  |  |  |
| 7 | 1 | 1 | 2 | 0 | -1 | 1 | -1 |  |  |  | 3 |  | 2 | 3 | 3 |  |  | 3 |  |  | 3 |  |  |
| 8 | 2 | 2 | 3 | 1 | 0 | 2 | 0 |  |  |  | 4 |  | 3 | 4 | 4 |  |  | 4 |  |  | 4 |  |  |
| 9 | 0 | 0 | 1 | -1 | -2 | 0 | -2 |  |  |  | 2 |  | 1 | 2 | 2 |  |  | 2 |  |  | 2 |  |  |
| 10 | -2 | -2 | -1 | -3 | -4 | -2 | -4 |  |  |  |  | -1 | 0 | 0 |  |  |  | 0 |  |  | 0 |  |  |
| 11 | -1 | -1 | 0 | -2 | -3 | -1 | -3 |  |  |  | 1 |  | 0 | 1 | 1 |  |  | 1 |  |  | 1 |  |  |
| 12 | -1 | -1 | 0 | -2 | -3 | -1 | -3 |  |  |  |  |  |  | 1 | 1 |  |  | 1 |  |  | 1 |  |  |
| 13 | -2 | -2 | -1 | -3 | -4 | -2 | -4 |  |  |  |  |  |  |  |  |  |  | 0 |  |  | 0 |  |  |
| 14 | -2 | -2 | -1 | -3 | -4 | -2 | -4 |  |  |  |  |  | 0 |  |  |  |  | 0 |  |  | 0 |  |  |
| 15 | 0 | 0 | 1 | -1 | -2 | 0 | -2 |  |  |  |  |  | 1 | 2 |  | 2 |  | 2 |  |  | 2 |  |  |
| 16 | 0 | 0 | 1 | -1 | -2 | 0 | -2 |  |  |  |  |  |  |  |  |  |  | 2 |  |  |  |  |  |
| 17 | -2 | -2 | -1 | -3 | -4 | -2 | -4 |  |  |  |  |  |  |  |  |  |  |  |  |  |  |  |  |

TABLE 11-continued

| j  | 0  | 1  | 2  | 3  | 4  | 5  | 6  | 7 8 9 10 | 11 | 12 | 13 | 14 15 16 | 17 | 18 | 19 | 20 | 21 | 22 |
|----|----|----|----|----|----|----|----|----------|----|----|----|----------|----|----|----|----|----|----|
| 18 | 1  | 1  | 2  | 0  | −1 | 0  | −1 |          |    |    |    |          | 3  |    |    |    |    |    |
| 19 | 0  | 0  | 1  | −1 | −2 | 0  | −2 |          |    |    |    |          | 2  |    |    |    |    |    |
| 20 | −2 | −2 | −1 | −3 | −4 | −2 | −4 |          |    |    |    |          | 0  |    |    |    |    |    |
| 21 | 0  | 0  | 1  | −1 | −2 | 0  | −2 |          |    |    |    |          | 2  |    |    | 2  |    |    |
| 22 | 1  | 1  | 2  | 0  | −1 | 0  | −1 |          |    |    |    |          | 3  |    |    | 3  |    |    |

Further, the vehicle security network design device may calculate a device's controllability (DC) with respect to each of the functional elements using the transitive closure matrix calculated as shown in Table 11. The vehicle security network design device may define a device's controllability of a vertex $v_i$ as $DC_i$. For example, in a case of calculating a device's controllability of a tenth vertex $v_9$, the vehicle security network design device may calculate a greatest value among data values of a tenth row as the device's controllability of the tenth vertex $v_9$. In further detail, $t_{9,j}$ written in the tenth row of the transitive closure matrix of Table 11 are 0, 0, 1, −1, −2, . . . , 2, and the vehicle security network design device may assign "2" which is the greatest value thereamong as $DC_9$. In this example, the device's controllability may be defined as 5 classes from $DC_i=0$ having a least difference in the ASIL class to $DC_i=4$ having a greatest difference in the ASIL class. However, the above description about the classes of the device's controllability are provided as an example only for better understanding of the disclosure and thus, should not construed as limiting or restricting the scope of other embodiments. For example, it is obvious to a person skilled in the art that more elaborate device's controllability classes or more convenient device's controllability classes may be assigned depending on a need of a designer. FIG. 5 illustrates the graph model reflecting device's controllabilities of all functional elements in the vehicle which are calculated by the vehicle security network design device.

Figure 6:
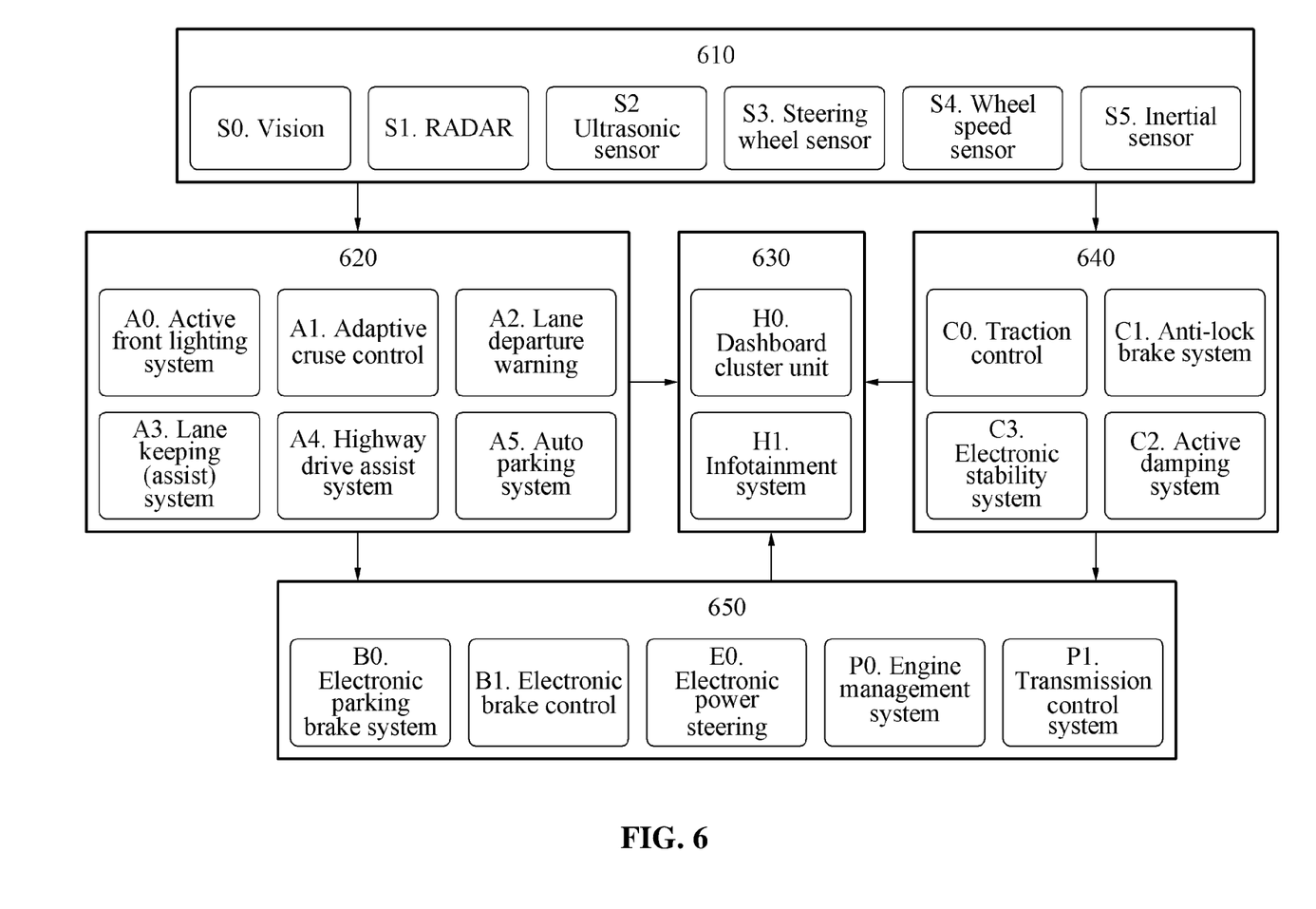
FIG. 6 illustrates an example of a connection relationship of functional elements included in a vehicle according to an embodiment.

FIG. 6 illustrates an example of a connection relationship of functional elements included in a vehicle according to an embodiment. A vehicle security network design device may receive data information exchanged between modules included in a predesigned vehicle as shown in the following Table 12.

TABLE 12

| Domain | No | Functional element | ASIL class | Data reception (Receiving From) | Data transmission (Sending To) |
|---|---|---|---|---|---|
| ADAS (620) | $a_0$ | Adaptive cruise control | D | s0. steer wheel angle<br>s1. wheel speed of each wheel<br>s3. Front vehicle tracking info<br>s5. Front vehicle track info, Lane info | p0. Throttle command<br>b1. Brake pressure command<br>h0. Set speed, headway gap info |
| | $a_1$ | Lane departure warning system | D | s0. steer wheel angle<br>s1. Wheel speed of each wheel<br>S6. Lane info | h0. Warning |
| | $a_2$ | Lane keeping (assist) system | D | s0. steer wheel angle<br>s1. wheel speed of each wheel<br>s5. Lane info<br>s6. yaw rate, lateral acceleration | b1. braking pressure<br>e0. steering torque<br>h0. Warning |
| | $a_3$ | Highway drive assist system | D | s0. steer wheel angle<br>s1. wheel speed of each wheel<br>s3. front vehicle tracking info<br>s5. front vehicle track info, Lane info<br>s6. Lateral acceleration, yaw rate<br>h1. road condition | b1. braking pressure<br>p0. throttle command<br>e0. steering torque/target angle<br>h0. current set speed, warning |
| | $a_4$ | Active front lighting system | B | s0. steer wheel angle<br>s1. wheel speed of each wheel<br>s3. front vehicle tracking info<br>s5. front vehicle track info, Lane info | h0. high beam info |
| | $a_5$ | Auto parking system | D | s0. steer wheel angle<br>s1. wheel speed of each wheel<br>s4. surrounding vehicle info<br>s6. yaw rate | p0. throttle command<br>p1. gear engage command(P/R/D)<br>b1. brake pressure command |

TABLE 12-continued

| Domain | No | Functional element | ASIL class | Data reception (Receiving From) | Data transmission (Sending To) |
|---|---|---|---|---|---|
| | | | | | b0. parking brake enable<br>t0. target steering wheel angle<br>h0. current parking space info |
| Chassis (640) | $c_0$ | Traction control | C | s0. Steering wheel angle<br>s1. Wheel speed<br>s6. Longitudinal acceleration | p0. throttle command<br>p1. transmissioin command(clutch (dis)engage)<br>b1. target brake pressure<br>h0. intervention info |
| | $c_1$ | Anti-lock braking system | D | s1. wheel speed info | b1. Target brake pressure<br>p1. transmission command(clutch control)<br>h0. intervention info |
| | $c_2$ | Active damping system | C | s0. steering wheel angle<br>s1. wheel speed info.<br>s6. yaw rate, lateral acceleration, longitudinal acceleration | (Embedded actuator) Target damping coefficient |
| | $c_3$ | Electronic stability system | D | s0. steering wheel angle<br>s1. wheel speed info.<br>s6. yaw rate, lateral acceleration | b1. target brake pressure<br>h0. intervention info |
| Brake (650) | $b_0$ | Electronic parking brake system | B | $a_5$. auto parking system | h0. parking brake status |
| | $b_1$ | Electronic Brake control | D | $a_0$. adaptive cruise control<br>$a_2$. lane keeping (assist) system<br>$a_3$. highway drive assist system<br>$a_5$. auto parking system<br>$c_0$. traction control<br>$c_1$. anti-lock braking system<br>$c_3$. electronic stability system | — |
| HMI (630) | $h_0$ | Dashboard, cluster unit | A | (Described in ADAS and chassis modules) | — |
| | $h_1$ | Infotainment system | B | — | (Described in ADAS module) |
| Power train (650) | $p_0$ | Engine management system | D | (Described in ADAS and chassis modules) | — |
| | $p_1$ | Transmission control system | D | (Described in ADAS and chassis modules) | — |
| Sensor (610) | $s_0$ | Steering wheel sensor | C | — | (Described in ADAS and chassis modules) |
| | $s_1$ | Wheel speed sensor | C | — | (Described in ADAS and chassis modules) |
| | $s_2$ | Tire pressure sensor | A | — | (Described in ADAS and chassis modules) |
| | $s_3$ | RADAR | D | — | (Described in ADAS and chassis modules) |
| | $s_4$ | Ultrasonic sensor | A | — | (Described in ADAS and chassis modules) |
| | $s_5$ | Vision (camera and tracking module) | D | — | (Described in ADAS and chassis modules) |
| | $s_6$ | Inertial sensor(Acceleration, yaw rate) | C | — | (Described in ADAS and chassis modules) |

TABLE 12-continued

| Domain | No | Functional element | ASIL class | Data reception (Receiving From) | Data transmission (Sending To) |
|---|---|---|---|---|---|
| Steer (650) | $t_0$ | Electronic power steering | D | (Described in ADAS and chassis modules) | — |

Referring to FIG. 6, a schematic example of wired and wireless networking in the vehicle defined as shown in Table 12 is illustrated.

Figure 7A:
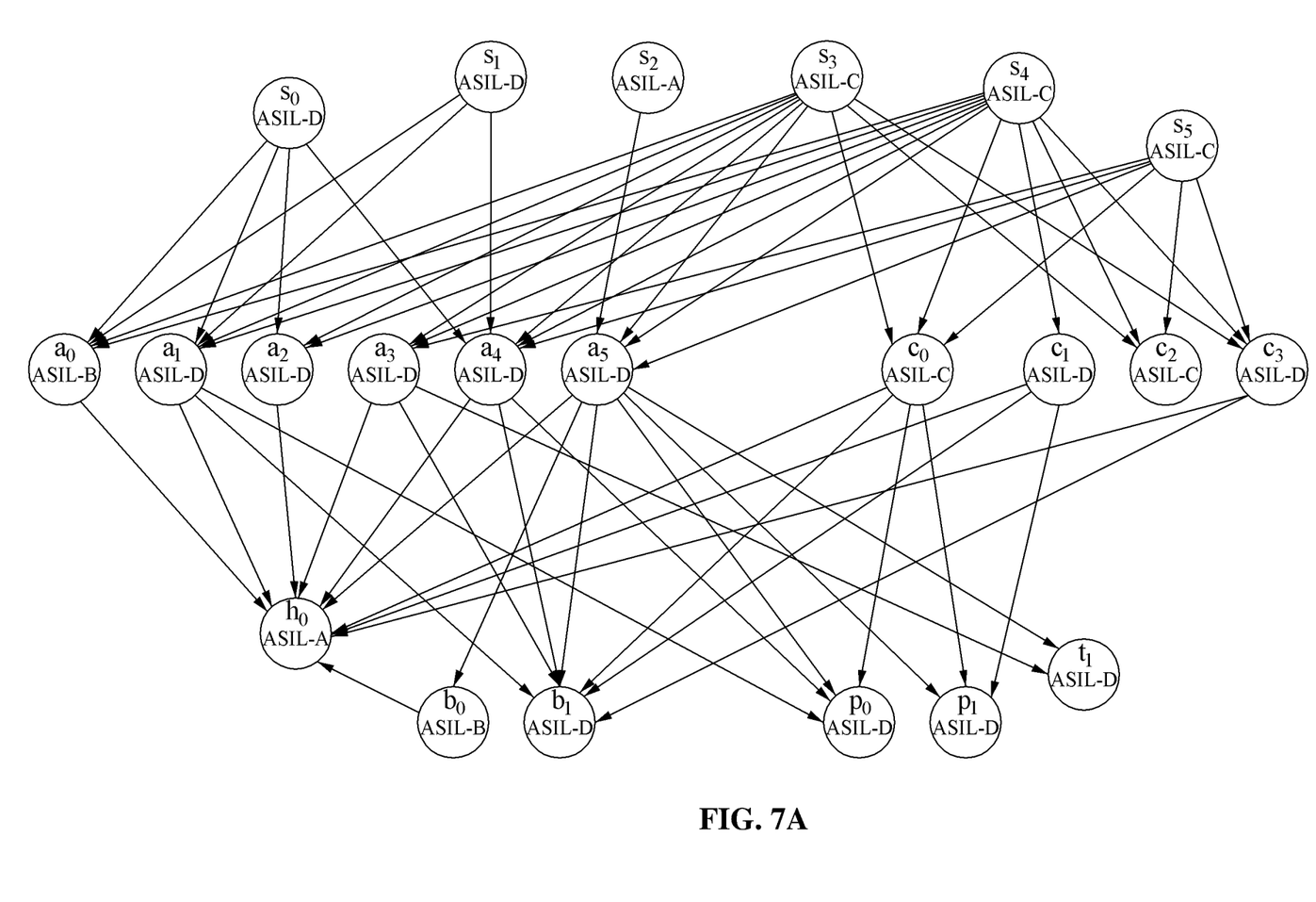
FIG. 7A illustrates a directed graph model generated by a vehicle security network design device according to an embodiment.

FIG. 7A illustrates a directed graph model generated by a vehicle security network design device according to an embodiment. Referring to FIG. 7A, a directed graph model which represents ASIL classes and a connection relationship between a plurality of functional elements in wired and wireless networks in the vehicle defined as shown in Table 12 and FIG. 6 is illustrated.

Figure 7B:
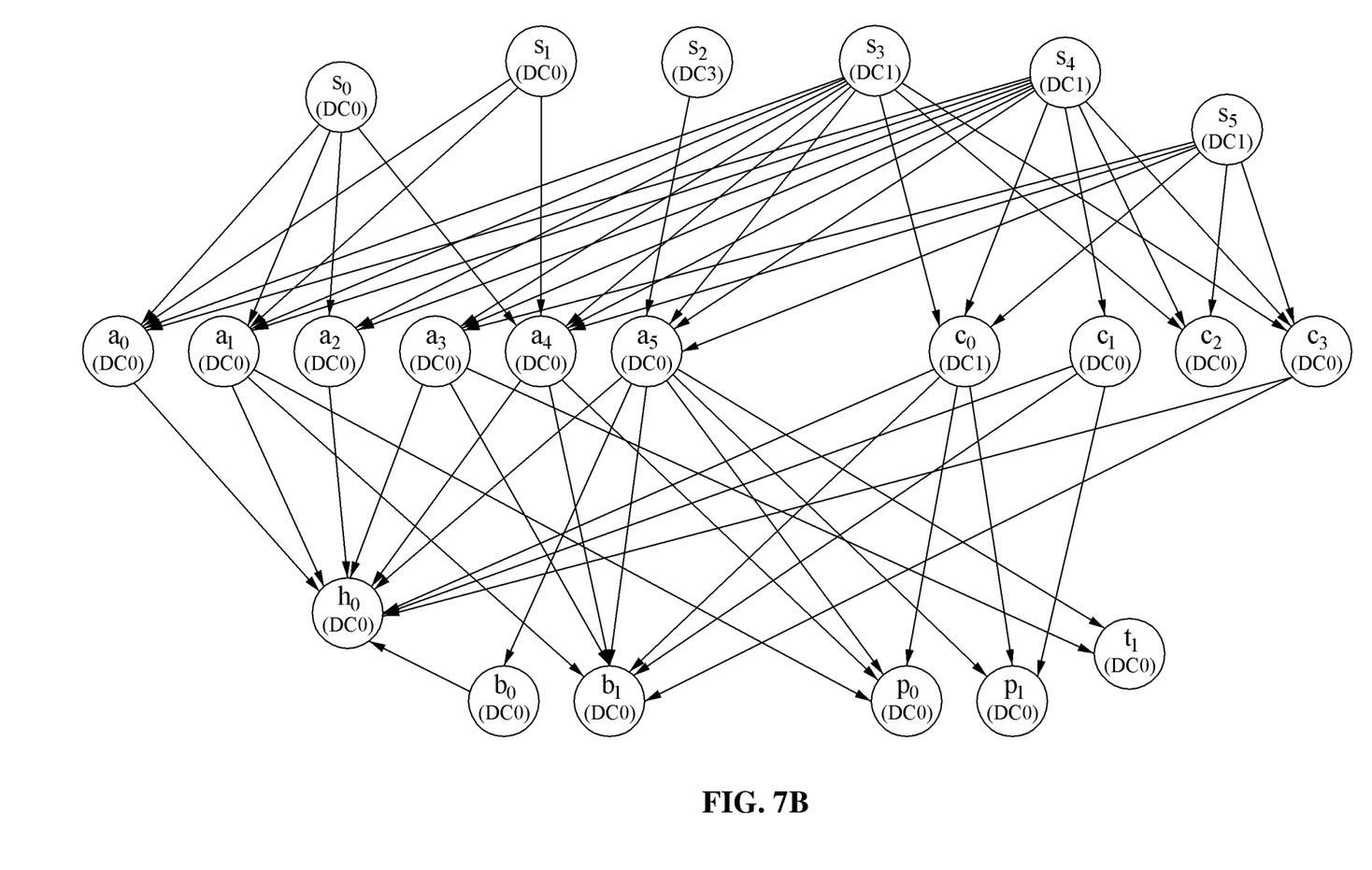
FIG. 7B illustrates a graph model reflecting a device's controllability from the directed graph model generated in FIG. 7A.

FIG. 7B illustrates a graph model reflecting a device's controllability from the directed graph model generated in FIG. 7A. A vehicle security network design device may calculate an edge weight matrix W and a transitive closure matrix T from the directed graph model described with reference to FIG. 7A. Further, the vehicle security network design device may calculate a device's controllability $DC_i$ corresponding to each of functional elements using the transitive closure matrix T. The description provided above may apply to the process of calculating the device's controllability, and thus duplicate description will be omitted.

Referring to FIG. 7B, device's controllabilities $DC_i$ with respect to remaining functional elements, except for DC3 of a tire pressure sensor $s_2$, DC1 of a radar $s_3$, DC1 of an ultrasonic sensor $s_4$, DC1 of a vision sensing module $s_5$ and DC1 of an anti-lock braking system $c_1$, may be calculated to be "0".

A modeling algorithm related to a risk analysis model described in this example may be used to evaluate device's controllabilities of ECUs in the vehicle and to selectively detect a device to be affected when a security threat to a predetermined device occurs on a network. For example, in a case in which a security threat occurs at a predetermined node $s_2$, $s_3$, the vehicle security network design device may select a functional element having a higher ASIL class among functional elements existing in a range reachable from the corresponding node and display the corresponding functional element emphatically on a display of a user. In a case of a system with a huge IVN, it may not be easy to analyze functional elements with security vulnerability manually one by one. The vehicle security network design device may inspect the functional elements with security vulnerability in advance using a simulator to which the modeling algorithm related to the risk analysis model is applied, thereby increasing the safety.

The vehicle security network design device may calculate a likelihood of risk occurrence with respect to each of the plurality of functional elements in the vehicle, an ASIL which provides a risk management standard with respect to each of the plurality of functional elements and a device's controllability with respect to each of the plurality of functional elements. Further, a manager in the vehicle security network design device may generate a risk analysis model of the plurality of functional elements based on the likelihood, the ASIL and the device's controllability. For example, with respect to the IVN suggested as shown in Table 12, the vehicle security network design device may generate a risk analysis model as shown in the following Table 13.

TABLE 13

| ASIL class | Device's controllability | Risk occurrence likelihood | | | |
|---|---|---|---|---|---|
| | | D1 | D2 | D3 | D4 |
| QM | DC0 | QM | QM | QM | QM |
| | DC1 | QM | QM | QM | S-ASIL A |
| | DC2 | QM | QM | S-ASIL A | S-ASIL B |
| | DC3 | QM | S-ASIL A | S-ASIL B | S-ASIL C |
| | DC4 | S-ASIL A | S-ASIL B | S-ASIL C | S-ASIL D |
| ASIL A | DC0 | QM | QM | QM | S-ASIL A |
| | DC1 | QM | QM | S-ASIL A | S-ASIL B |
| | DC2 | QM | S-ASIL A | S-ASIL B | S-ASIL C |
| | DC3 | S-ASIL A | ASIL B | S-ASIL C | S-ASIL D |
| ASIL B | DC0 | QM | QM | S-ASIL A | S-ASIL B |
| | DC1 | QM | S-ASIL A | S-ASIL B | S-ASIL C |
| | DC2 | S-ASIL A | S-ASIL B | S-ASIL C | S-ASIL D |
| ASIL C | DC0 | QM | S-ASIL A | S-ASIL B | S-ASIL C |
| | DC1 | S-ASIL A | S-ASIL B | S-ASIL C | S-ASIL D |
| ASIL D | DC0 | S-ASIL A | S-ASIL B | S-ASIL C | S-ASIL D |

In Table 13, QM may indicate a basic quality without a special requirement. In a direction from S-ASIL A to S-ASIL D, a standard required for security threat related risk management with respect to a class may become higher.

A secure-ASIL (S-ASIL) may be a risk analysis class assigned by the vehicle security network design device and indicate a risk analysis class of each of the plurality of functional elements calculated based on the likelihood, the ASIL and the device's controllability. According to the present embodiment, an effect of increasing the safety of security may be expected in that functional elements vulnerable to security threats may be evaluated based on a device's controllability even with respect to a networking system in a complex vehicle.

The embodiments described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

The invention claimed is:

1. A method of managing an intra-vehicle network (IVN) of a vehicle based on a device's controllability of a functional element from a plurality of functional elements connected using the IVN in the vehicle, comprising:

calculating an edge weight matrix indicating a connection state of the plurality of functional elements in the vehicle based on a difference in automobile safety integrity level (ASIL) and a connection structure between the plurality of functional elements;

calculating a transitive closure matrix indicating a sum of weights of at least one edge included in a path between two random vertices using the edge weight matrix; and calculating the device's controllability of the functional element corresponding to a first vertex based on the ASIL of each of at least one vertex having a path connected from the first vertex, managing the IVN of the vehicle based on the respective calculated device's controllability;

wherein the calculating of the device's controllability comprises calculating a difference in the ASIL between the first vertex and a second vertex as the device's controllability of the functional element corresponding to the first vertex, the second vertex among at least one vertex having a path connected from the first vertex, wherein the second vertex is a vertex which maximizes the difference in the ASIL from the first vertex, and wherein the device's controllability for a negative number is considered '0'.

2. The method of claim 1, wherein the calculating of the edge weight matrix further comprises generating vertices corresponding to the plurality of functional elements, and generating a graph including an edge indicating whether data is transmitted and received between two random vertices.

3. The method of claim 2, wherein the generating of the graph including the edge comprises generating the graph including any one of a one-way edge and a two-way edge based on a data transmission and reception direction between the two random vertices.

4. The method of claim 3, wherein the generating of the graph including the edge comprises generating a weighted, directed graph in which a difference in the ASIL between two vertices corresponding each edge is represented on a path of the each edge.

5. The method of claim 1, wherein the calculating of the device's controllability comprises calculating a maximum value among values of a first row of the transitive closure matrix corresponding to the first vertex as the device's controllability of the functional element corresponding to the first vertex.

* * * * *